United States Patent [19]

DePonti

[11] Patent Number: 4,557,187
[45] Date of Patent: Dec. 10, 1985

[54] HOUSEHOLD APPLIANCE FOR PREPARING HOT BEVERAGES

[75] Inventor: Luigi DePonti, Milan, Italy

[73] Assignee: Alfonso Bialetti & Co., Fonderia in Conchiglia S.p.A., Omegna-Crusinallo, Italy

[21] Appl. No.: 687,980

[22] Filed: Dec. 31, 1984

Related U.S. Application Data

[62] Division of Ser. No. 593,039, Mar. 23, 1984, Pat. No. 4,516,484.

[30] Foreign Application Priority Data

Mar. 23, 1983 [IT] Italy .............................. 21234/83[U]
Apr. 15, 1983 [IT] Italy .............................. 21565/83[U]

[51] Int. Cl.⁴ ............................................. A47J 31/00
[52] U.S. Cl. ...................................... 99/279; 99/293; 126/379
[58] Field of Search .............. 99/279, 284, 288, 290, 99/293, 294, 291; 126/379, 369; 426/433

[56] References Cited

U.S. PATENT DOCUMENTS

| | | | |
|---|---|---|---|
| 351,685 | 10/1886 | Bammerlin | 126/379 |
| 409,274 | 8/1889 | Cordrey | 126/379 |
| 887,844 | 5/1908 | Prater | 126/379 |
| 1,393,546 | 10/1921 | Kolchinsky | 126/379 |

Primary Examiner—Robert W. Jenkins
Attorney, Agent, or Firm—Karl F. Ross; Herbert Dubno

[57] ABSTRACT

An appliance for preparing hot beverages, such as a coffee maker, comprises a boiling chamber heated by an external or internal source, a vessel adjoining the boiling chamber in which water is indirectly heated to form an infusion, and a cup removably seated on that vessel for holding a liquid—e.g. milk—to be separately heated. A tube with a restricted outlet, which may be designed as a gooseneck, rises from the boiling chamber to discharge steam into the liquid contained in the cup. The boiling chamber may form a platform for the infusion-bearing vessel or may spacedly surround same, the steam tube passing axially through the vessel in the latter instance.

6 Claims, 4 Drawing Figures

HOUSEHOLD APPLIANCE FOR PREPARING HOT BEVERAGES

This application is a division of application Ser. No. 593,039 filed Mar. 23, 1984, now U.S. Pat. No. 4,516,484.

FIELD OF THE INVENTION

My present invention relates to an appliance, especially one for household use, serving for the preparation of hot beverages. More particularly, but not exclusively, this invention pertains to a device used for making coffee with hot milk, known as Capuccino.

OBJECT OF THE INVENTION

The object of my present invention is to provide a convenient appliance for the purpose set forth.

SUMMARY OF THE INVENTION

Such an appliance, pursuant to my present invention, essentially comprises a boiling chamber to be filled with water for generating steam upon being exposed to a source of heat, a receptacle remote from that chamber designed to contain a liquid—such as milk—to be separately heated, and conduit means extending from the boiling chamber for emitting the generated steam into the last-mentioned liquid through an outlet located within that receptacle.

According to a more particular feature of my invention, usable when a beverage to be prepared is an infusion such as coffee to be mixed with the steamed liquid, the appliance further comprises a vessel separated from the boiling chamber by one or two thermally conductive walls through which water in that vessel can be indirectly heated. The vessel, accordingly, may be internally provided with filter means for holding ground coffee or other organic matter from which an infusion is to be brewed.

Advantageously, the receptacle containing the liquid to be steamed is carried above the boiling chamber on the infusion-forming vessel. The boiling chamber may be designed as a hollow base or platform supporting the vessel or as a jacket spacedly surrounding at least the lower part thereof.

In any event, the water in the boiling chamber may be vaporized by either an external or an internal source of heat. That source, for example, could be a gas burner or a hot plate on which the boiling chamber is placed, or a suitably insulated resistance element in that chamber to be energized through a cable plugged into a wall socket.

BRIEF DESCRIPTION OF THE DRAWING

The above and other features of my invention will now be described in detail with reference to the accompanying drawing in which.

SPECIFIC DESCRIPTION

Figure 1:
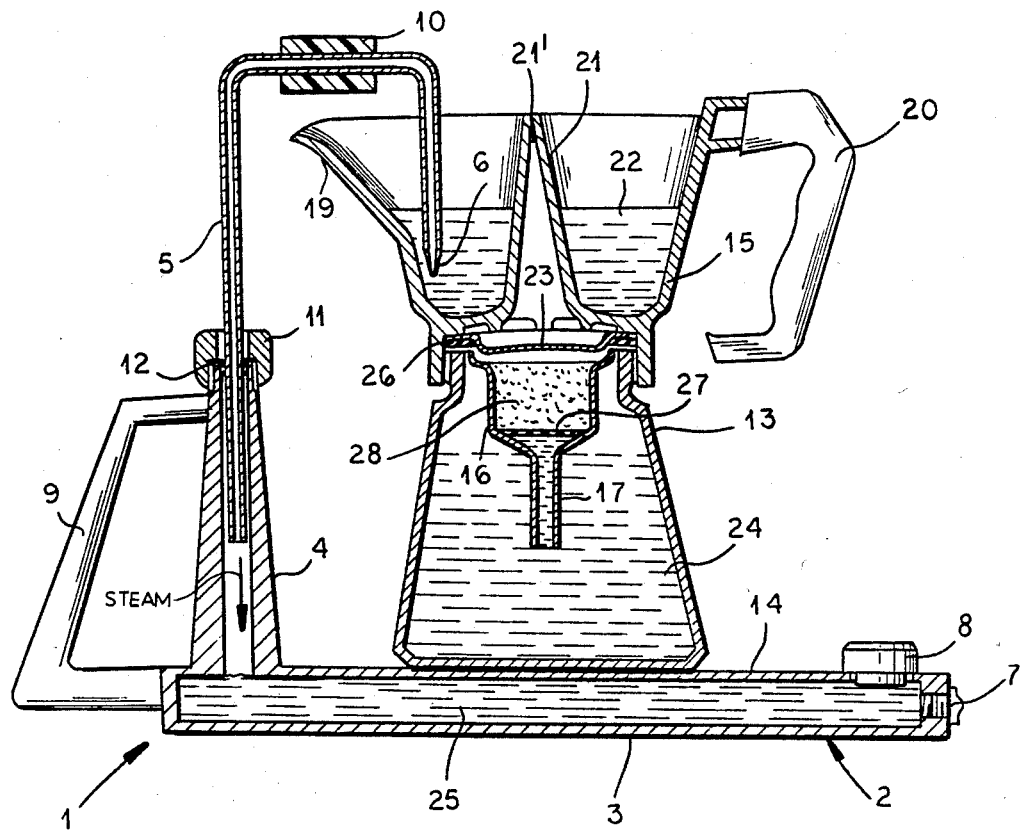
FIG. 1 is a sectional elevational view of an appliance embodying my invention.

FIG. 1 shows a household appliance 1 according to my present invention, comprising a hollow base 2 which constitutes a boiling chamber bounded by a lower wall 3 and an upper wall 14. These walls are preferably made of a metal of good thermal conductivity, such as copper. A riser tube 4 extends from the upper chamber wall 14 and telescopically receives the longer leg of an extension tube 5 of inverted-J shape. Tube 5 reaches as a gooseneck around the rim of an upwardly open, cup-shaped receptacle 15 having a pouring spout 19 and a handle 20; a central boss 21 of cup 15 reduces its effective volume so that a predetermined quantity of milk 22 can reach a level well above a nozzle 6 formed by a tapered outlet end of the short leg of tube 5. Cup 15 is supported on a filter cover 23 closing the top of an infusion-brewing vessel 13, such as a conventional percolator, which sits on the upper chamber wall 14 and has at least its bottom made of a metal of good thermal conductivity in order to let a body of water 24 in that vessel be heated indirectly by water 25 boiling within chamber 2. That chamber is further provided with a pressure-relief valve 7, a filling hole closed during operation by a plug 8, and a handle 9 also serving as a brace for tube 4. The upper end of that tube is threaded to mate with a clamping nut 11 which holds the extension tube 5 in position through a sealing ring 12. A nonmetallic sleeve 10 on the horizontal part of tube 5 serves as a thermally insulating grip to enable a raising or lowering of the tube upon a loosening of nut 11.

Filter cover 23, bearing upon a sealing ring 26, holds a funnel 16 with a neck 17 suspended from the rim of vessel 13. A filter screen 27 in funnel 16 supports a load of ground coffee 28 through which the water 24 in vessel 13 percolates upon being heated by way of boiling chamber 2, the coffee rising through the boss 21 and passing at 21' into the cup 15. Steam generated in that chamber, rising through tubes 4 and 5, has previously been ejected by a nozzle 6 into the layer of milk 22 present in cup 15. Thus, the brewing of the coffee infusion in percolator 13 coincides with the steaming of the milk in receptacle 15, to produce a Capuccino-type beverage.

As already noted, the water 25 in chamber 2 can be boiled by means of either an external or an internal heat source.

Figure 2:
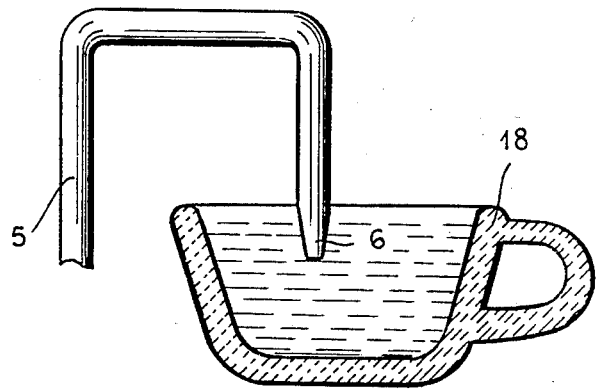
FIG. 2 is a fragmentary view similar to part of FIG. 1, showing an alternative arrangement.

FIG. 2 shows the possibility of heating a beverage in a drinking cup 18 by steam emitted from nozzle 6 of tube 5; thus, the device of FIG. 1 can also be used for reheating coffee about to be served in cup 18.

Figure 3:
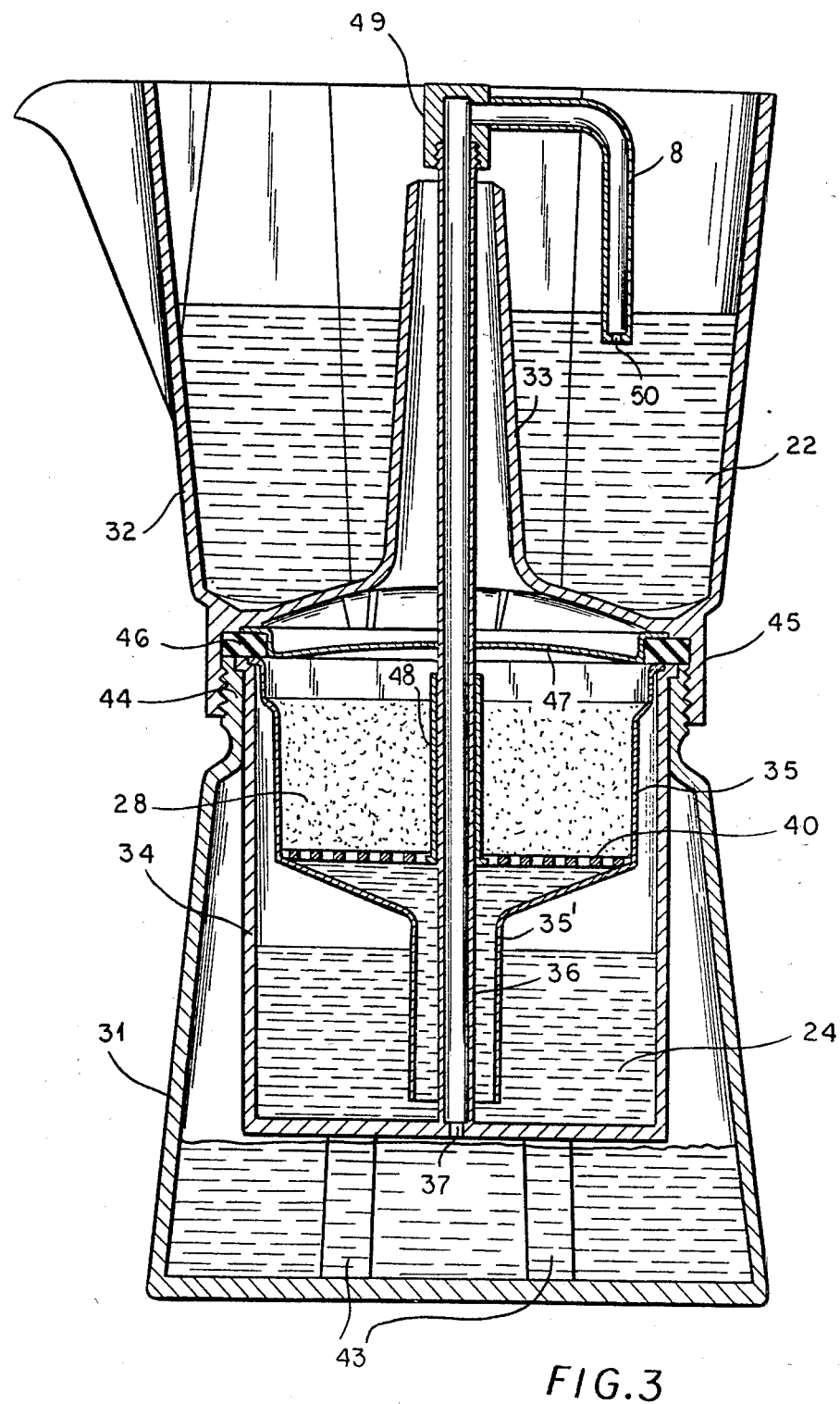
FIG. 3 is a sectional elevational view of another appliance embodying my invention.

Reference will now be made to FIG. 3 showing a household appliance of the same basic structure as the coffee maker illustrated in FIG. 1, comprising an annular boiling chamber 31 centered on a vertical axis, an infusion-brewing vessel 34 coaxial therewith, and a cup-shaped receptacle 32; containers 31, 34 and 32 are respectively filled with water 25, water 24 and milk 22. Vessel 34 is spacedly surrounded by the peripheral wall of chamber 31 and is raised above the bottom of that chamber by several feet 43. The top of chamber 31 forms a threaded rim 44 onto which an annular bottom flange 45 of cup 32 is screwed. A sealing ring 46, clamped between rim 44 and flange 45, holds in position a funnel 35 and a filter cover 47. A filter 40 separated in funnel 35 has an upstanding nipple 48 embracing a riser tube 36 which rests on the bottom of vessel 34 and communicates with the interior of chamber 31 through a restricted opening 37; tube 36 passes axially, with clearance, through the neck 35' of funnel 35 as well as through an upwardly open central nipple 33 of receptacle 32 which rises above the level of the volume of milk 22 contained therein; the tube penetrates the filter cover 47 with a tight fit. A cap nut 49 screwed onto the threaded top of tube 36 opens laterally into an extension tube 38 which dips into the milk 22 and has a restricted outlet 50 for the emission of steam; tubes 36 and 38 thus form again a gooseneck reaching from above into the cup-shaped milk receptacle.

The operation of the device of FIG. 3 is analogous to that of the appliance described with reference to FIG. 1. Thus, the mass of coffee grounds 28 supported on filter screen 40 is percolated by the rising water 24 which is indirectly heated from a nonillustrated source through the intermediary of the water 25 boiling in chamber 41. The steam generated in that chamber is injected into the milk layer 22 for heating same. The brewed coffee then overflows from boss 33 into the steamed coffee.

Chamber 31 may be provided with a nonillustrated safety valve similar to that shown at 7 in FIG. 1. As in the preceding embodiment, this chamber may be heated from below by a gas flame or a hot plate, for example, or may be internally provided with an electrical resistance element.

Figure 4:
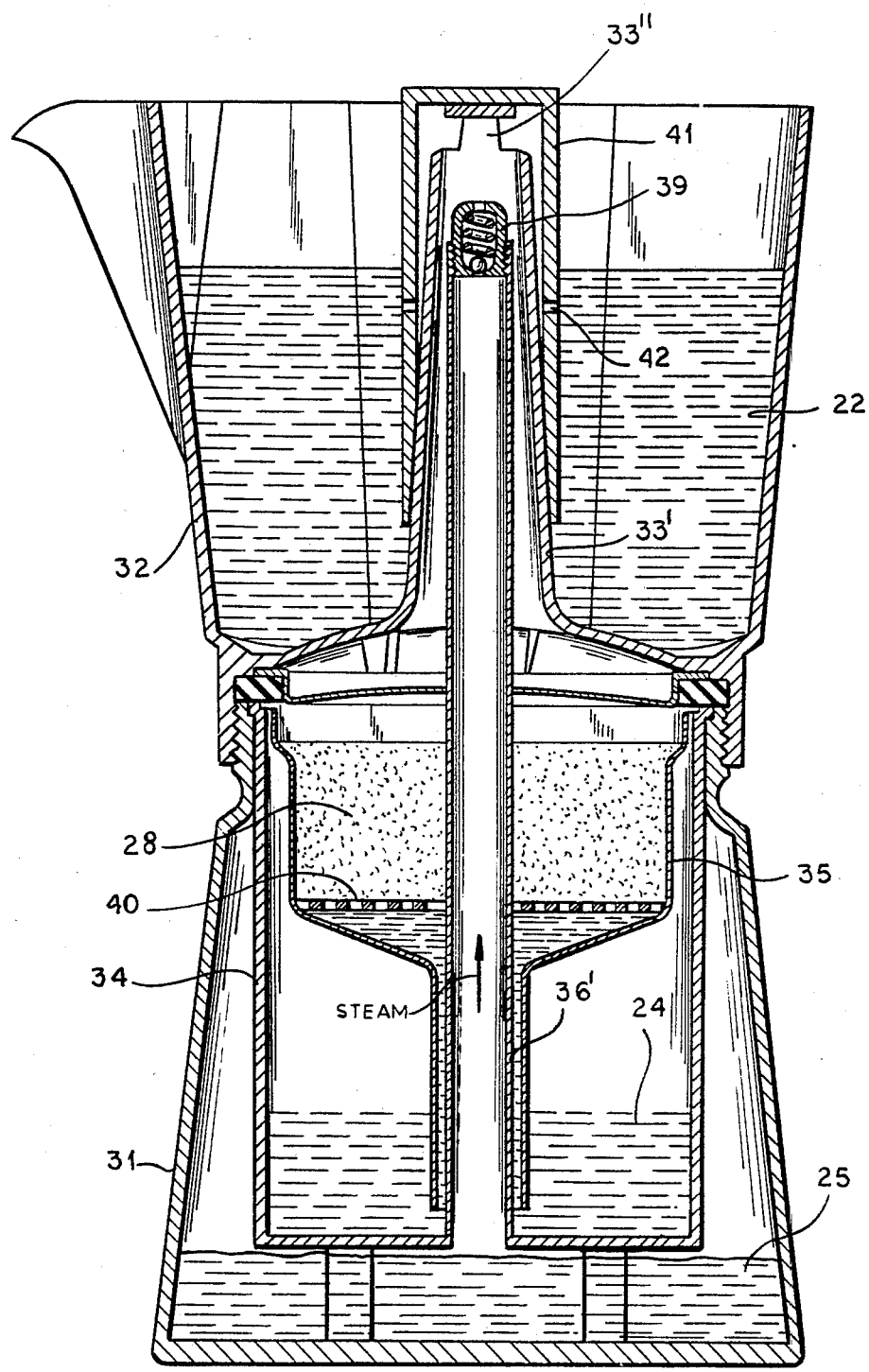
FIG. 4 is a view similar to that of FIG. 3, illustrating a modification of that appliance.

FIG. 4 illustrates a modification of the appliance of FIG. 3 in which the central nipple 33' of receptacle 32 has an upward extension 33" supporting a closure cap 41. The latter spacedly surrounds that nipple and forms therewith a steam compartment communicating with the interior of receptacle 32 through peripheral orifices 42 lying below the level of milk layer 22. Riser tube 36' terminates within nipple 33' and is provided at its upper end with a throttle valve 39 restricting the overflow of steam. That valve could also be disposed at a lower point of the tube. The device of FIG. 4 operates generally in the same manner as that of FIG. 3.

Naturally, the cup 32 of FIGS. 3 and 4 can also be provided with a handle, which has not been illustrated.

I claim:

1. An appliance for preparing a hot beverage, comprising:
    a generally flat hollow heatable boiling chamber for water to be contained therein and defining a flat surface forming a heat-transfer platform;
    a vessel removably positioned on said platform so as to be heated thereby through a heat conductive wall of said vessel and adapted to contain a liquid;
    filter means received in said vessel for supporting organic matter from which an infusion is brewed in said liquid to form said beverage;
    an upwardly open receptacle removably mounted upon said vessel and forming a cover therefor;
    conduit means rising from said platform adjacent said vessel and said receptacle and communicating with the interior of said chamber and provided with a gooseneck having a downwardly open nozzle positioned to overhang said vessel for discharging a heated fluid generated in said chamber into said receptacle.

2. An appliance as defined in claim 1 wherein said receptacle is supported on a cover closing the top of said vessel.

3. An appliance as defined in claim 1 wherein said conduit means comprises a riser tube on said platform and an extension tube of inverted J-shape forming said gooseneck, said extension tube being telescoped in said riser tube.

4. An appliance for preparing a hot beverage which comprises:
    a lower vessel containing a body of water adapted to be heated;
    a tube rising from said vessel and adapted to conduct steam therefrom, said tube having a downwardly turned spout;
    a cup adapted to contain milk and positioned above said vessel so that said spout can enter into the milk in said cup and froth said milk;
    a receptacle mounted on said vessel and in a heat-conducting relationship therewith, said receptacle containing a body of water independent of said vessel; and
    filter means in said receptacle containing a beverage-forming substance adapted to be percolated through by water from that receptacle rising through said filter means to form a hot beverage thereupon transferred from said filter means to said cup for combination with the frothed milk therein to process a Capuccino.

5. The appliance defined in claim 4 wherein said filter means includes a filter having a downwardly extending stem reaching into water in said receptacle, said filter being provided between a top of said receptacle and a bottom of said cup, said top of said receptacle being connectable to said bottom of said cup.

6. The appliance defined in claim 5 wherein said cup is formed with a tubular boss rising centrally in said cup and opening at a level above the milk therein.

* * * * *